United States Patent
Bonaccio et al.

(10) Patent No.: US 7,966,537 B2
(45) Date of Patent: Jun. 21, 2011

(54) DIGITAL RELIABILITY MONITOR HAVING AUTONOMIC REPAIR AND NOTIFICATION CAPABILITY

(75) Inventors: Anthony R. Bonaccio, Essex Junction, VT (US); Michael LeStrange, Essex Junction, VT (US); William R. Tonti, Essex Junction, VT (US); Sebastian T. Ventrone, Essex Junction, VT (US)

(73) Assignee: International Business Machines Corporation, Armonk, NY (US)

(*) Notice: Subject to any disclaimer, the term of this patent is extended or adjusted under 35 U.S.C. 154(b) by 39 days.

(21) Appl. No.: 12/479,914

(22) Filed: Jun. 8, 2009

(65) Prior Publication Data

US 2009/0254781 A1  Oct. 8, 2009

Related U.S. Application Data

(63) Continuation of application No. 10/863,194, filed on Jun. 8, 2004, now abandoned, which is a continuation-in-part of application No. 10/729,751, filed on Dec. 4, 2003, now Pat. No. 7,287,177.

(51) Int. Cl.
G01R 31/28 (2006.01)
(52) U.S. Cl. ........................................ 714/731
(58) Field of Classification Search .................. 714/731
See application file for complete search history.

(56) References Cited

U.S. PATENT DOCUMENTS

| | | |
|---|---|---|
| 4,563,897 A | 1/1986 | Moore |
| 4,639,915 A | 1/1987 | Bosse |
| 5,208,776 A | 5/1993 | Nasu et al. |
| 5,334,826 A | 8/1994 | Sata et al. |
| 5,420,571 A | 5/1995 | Coleman et al. |
| 5,459,342 A | 10/1995 | Nogami et al. |
| 5,654,896 A | 8/1997 | Ochi |
| 5,684,934 A | 11/1997 | Chen et al. |
| 5,688,232 A | 11/1997 | Flower |
| 5,771,420 A | 6/1998 | Suzuki et al. |
| 5,811,889 A | 9/1998 | Massie |
| 5,878,201 A | 3/1999 | Onishi |

(Continued)

FOREIGN PATENT DOCUMENTS

EP  204588 A2  12/1986

OTHER PUBLICATIONS

Notice of Allowance (Mail Date May 19, 2009) for U.S. Appl. No. 10/863,194, filed Jun. 8, 2004; Confirmation No. 5310.
Hatfield, J.V. and Hicks, P.J.; A sensitive integrated CMOS charge comparator; Feb. 17, 1989, IEEE; pp. 4/1-4/6.
Hatfield, J.V., York, T.A., Comer, J. and Hicks, P.J., Development of a new type of self-scanned electron image sensing integrated circuit, Jun. 1989, IEEE, vol. 24; pp. 704-710.
Yarema, R.J., Zimmerman, T., Williams, W., Bindley, M., Huffman, T., and Wagner, R.A., A high performance multi-channel preamplifier ASIC, Aug. 1992, IEEE, vol. 39; pp. 742-746.

(Continued)

*Primary Examiner* — Scott T Baderman
*Assistant Examiner* — Enam Ahmed
(74) *Attorney, Agent, or Firm* — Schmeiser, Olsen & Watt; David Cain

(57) ABSTRACT

A circuit for preventing failure in an integrated circuit. The circuit including: an original circuit; one or more redundant circuits; and a repair processor, including a clock cycle counter configured to count pulses of a pulsed signal, the repair processor configured to (a) replace the original circuit with a first redundant circuit or (b) configured to select another redundant circuit, the selection in sequence from a second redundant circuit to a last redundant circuit, and to replace a previously selected redundant circuit with the selected redundant circuit each time the cycle counter reaches a predetermined count of a set of pre-determined cycle counts.

10 Claims, 14 Drawing Sheets

U.S. PATENT DOCUMENTS

| | | | |
|---|---|---|---|
| 5,978,290 A | 11/1999 | Fujita | |
| 5,983,369 A | 11/1999 | Bakoglu et al. | |
| 6,057,180 A | 5/2000 | Sun et al. | |
| 6,085,334 A | 7/2000 | Giles et al. | |
| 6,098,182 A | 8/2000 | Cowan | |
| 6,153,450 A | 11/2000 | Deguchi | |
| 6,310,807 B1 | 10/2001 | Ooishi et al. | |
| 6,373,758 B1 | 4/2002 | Hughes et al. | |
| 6,425,092 B1 | 7/2002 | Evans et al. | |
| 6,490,210 B2 | 12/2002 | Takase et al. | |
| 6,577,156 B2 | 6/2003 | Anand et al. | |
| 6,586,961 B2 | 7/2003 | Chaisemartin | |
| 6,668,345 B1 | 12/2003 | Ooishi et al. | |
| 6,812,557 B2 | 11/2004 | Matsuo et al. | |
| 6,814,296 B2 | 11/2004 | Angle et al. | |
| 6,861,865 B1 | 3/2005 | Carlson | |
| 6,973,605 B1 * | 12/2005 | Templeton et al. | 714/718 |
| 6,993,446 B2 | 1/2006 | Gunawardana et al. | |
| 7,185,293 B1 * | 2/2007 | Ofer | 326/38 |
| 7,287,177 B2 | 10/2007 | Bonaccio et al. | |
| 2002/0108073 A1 | 8/2002 | Hughes | |
| 2002/0130697 A1 | 9/2002 | Braceras et al. | |
| 2002/0174384 A1 | 11/2002 | Graichen et al. | |
| 2003/0034995 A1 | 2/2003 | Osborn et al. | |
| 2003/0110407 A1 | 6/2003 | Maeda | |
| 2003/0133720 A1 | 7/2003 | Siegel et al. | |
| 2003/0139982 A1 | 7/2003 | Schwartz et al. | |
| 2004/0199841 A1 * | 10/2004 | Marr | 714/731 |

OTHER PUBLICATIONS

Yarema, R.J., Zimmerman, T., Williams, W., Bindley, M., Huffman, T., and Wagner, R.A., A high performance multi-channel preamplifier ASIC, Nov. 1991, IEEE, vol. 1; pp. 616-620.

Office Action (Mail Date Oct. 23, 2009) for U.S. Appl. No. 11/772,418, filed Jul. 2, 2007, First Named Inventor Anthony R. Bonaccio et al.; Confirmation No. 9550.

Notice of Allowance (Mail Date Jun. 18, 2010) for U.S. Appl. No. 11/772,418, filed Jul. 2, 2007; Confirmation No. 9550.

* cited by examiner

US 7,966,537 B2

DIGITAL RELIABILITY MONITOR HAVING AUTONOMIC REPAIR AND NOTIFICATION CAPABILITY

The present application is a continuation of U.S. patent application Ser. No. 10/863,194 filed on Jun. 8, 2004 which is a continuation-in-part of application Ser. No. 10/729,751 filed on Dec. 4, 2003, now U.S. Pat. No. 7,287,177 issued on Oct. 23, 2007.

FIELD OF THE INVENTION

The present invention relates to the field of fault tolerance in integrated circuits; more specifically, it is directed toward a circuit structure and method for repairing integrated circuit elements prior to failure, and a method of designing an integrated circuit with autonomic repair capability.

BACKGROUND OF THE INVENTION

As the frequency performance of integrated circuits continues to increase, the rate of certain failure mechanisms increases in proportion to operating frequency, thereby reducing the time over which an integrated circuit can be expected to reliably perform. Such degradations in reliability caused by technology features needed to improve performance are difficult to compensate for with current integrated circuit design techniques. Therefore, a structure and method for mitigating the probability of early failures due to increased operating frequency is needed.

SUMMARY OF THE INVENTION

A first aspect of the present invention is an integrated circuit, comprising: an original circuit; one or more redundant circuits; and a repair processor, including a clock cycle counter adapted to count pulses of a pulsed signal, the repair processor adapted to (a) replace the original circuit with a first redundant circuit or (b).

A second aspect of the present invention is method of preventing failure in an integrated circuit, comprising: providing an original circuit; providing one or more redundant circuits; and providing a repair processor, including a clock cycle counter for counting pulses of a pulsed signal, the repair processor for (a) replacing the original circuit with a first redundant circuit or for (b) in sequence from a second redundant circuit to a last redundant circuit, selecting another redundant circuit and replacing a previously selected redundant circuit with the selected redundant circuit each time the clock cycle counter reaches a predetermined count of a set of pre-determined cycle counts.

A third aspect of the present invention is an integrated circuit, comprising: an original circuit; and a stress reduction circuit coupled to the original circuit and coupled to and responsive to a repair processor, the repair processor including a clock cycle counter adapted to count pulses of a pulsed signal and the stress reduction circuit adapted to modify one or more operating parameters of the original circuit when the clock cycle counter reaches a particular pre-determined cycle count.

A fourth aspect of the present invention is a method for preventing failure of an integrated circuit, comprising: providing an original circuit; providing a repair processor, the repair processor including a clock cycle counter for counting pulses of a pulsed signal and providing a stress reduction circuit coupled to the original circuit and coupled to and responsive to the repair processor, the stress reduction circuit for modifying one or more operating parameters of the original circuit when the clock cycle counter reaches a particular pre-determined cycle count.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

Figure 1:
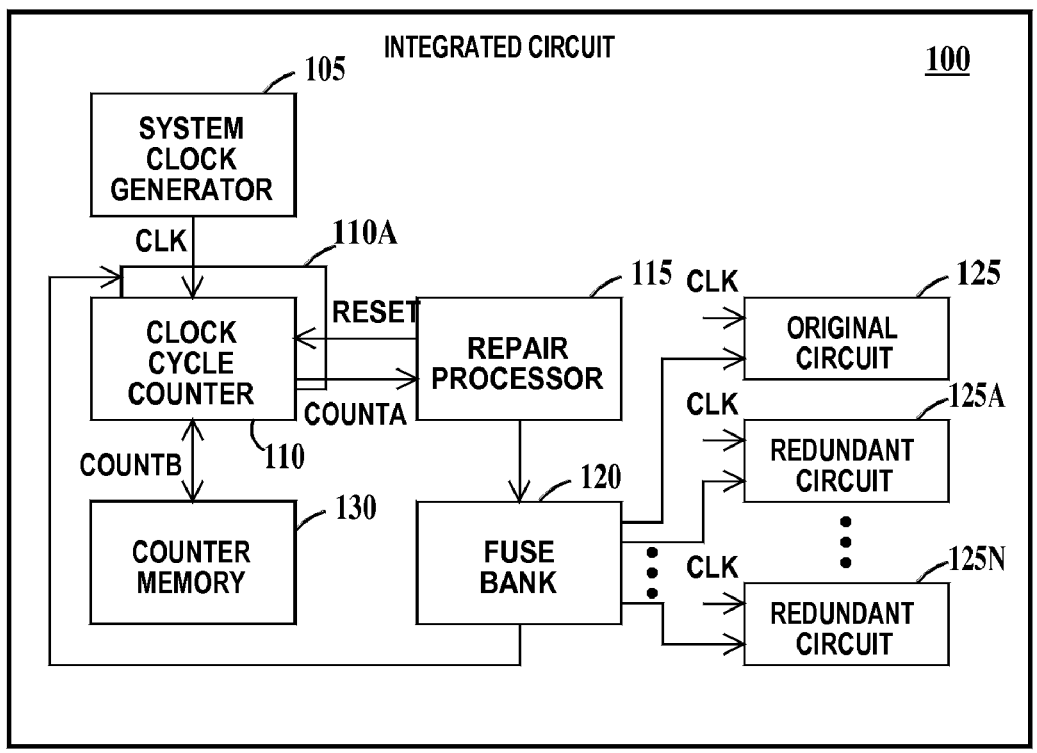
FIG. 1 is a schematic block diagram of an integrated circuit according to a first embodiment of the present invention.

For the purposes of the present invention, the terms integrated circuit and integrated circuit chip are interchangeable. A repair is defined as the replacement of a circuit element by a circuit element of the same function. A circuit element is defined as digital or analog circuit, a memory circuit, a latch, a group of logic gates, a logic gate or a device (such a transistor, a diode, a resistor, a capacitor, an inductor or a wire). A repair is further defined to include adjustment of a circuit element such that an attribute of an output of that circuit element is changed.

A signal cycle is defined as the sum of: the time the signal is maintained at a first state, the time required for the signal to transition to a second state from the first state, the time the signal is maintained at the second state and the time required for the signal to transition from the second state back to the first state. Cycles may thus be counted by counting every other transition of the signal state. A clock signal is a special type of pulsed signal. For a clock signal, the cycle is uniformly periodic. Although the present invention is described using clock cycles, it is equally applicable to other types of cyclic or pulsed signals, such as encoded, multiplexed or modulated digital signals.

For a given process technology statistical analysis shows that an integrated circuit element may be expected to reliably transition a finite number of times prior to failure. A number of environmental factors and electrical characteristics of the integrated circuit contribute to the results of this statistical analysis. For example, hot electron injection can stress the gate dielectric of the transistor each time the transistor is switched. The cumulative effect of many switching cycles may ultimately lead to transistor failure. Another example is a failure caused by electro-migration in the interconnect structure of an integrated circuit. At higher frequencies, more current is carried per unit time than at lower frequencies, causing the local current densities of chip interconnect structures to increase dramatically. While most prevalent in metallic structures, this phenomenon may also occur in heavily doped semiconductors. Current crowding in an isolated area may cause voids or stems to form in the circuit material resulting in open or short circuits. The electro-migration process will accelerate with the accompanying increase in temperature. These types of circuit failures and their respective probabilities can be related to system clock cycles.

In a simple example, given a microprocessor lifetime of 27.77 K power on hours (Kpoh) and a latch within the microprocessor operating at 1 GHz, the total clock cycles over the useful life of the chip equates to 100E15. It is determined that during each clock cycle the latch degrades at the rate of 1E-15% per clock cycle at a given $V_{DD}$ power level. With a specification set at 10% margin at 25 Kpoh, the reliable life of the latch is 90E15 clock cycles. Thus, a circuit tracking clock cycles can generate a notification to adjust a circuit element or replace a circuit element with a corresponding spare circuit element preemptively, that is, before actual failure occurs.

FIG. 1 is a schematic block diagram of an integrated circuit according to a first embodiment of the present invention. In FIG. 1, an integrated circuit chip 100 includes a system clock generator 105, a clock cycle counter 110, a redundant clock cycle counter 110A, a repair processor 115, an optional fuse bank 120, an original circuit 125 and a multiple of redundant circuits 125A through 125N, each redundant circuit capable of performing the same function as the original circuit. There may be only one redundant circuit. Additionally, integrated circuit 100 may include an on-chip count memory 130 for storing the cumulated number of cycles counted by clock cycle counter 110. Alternatively, the count memory 130 may be implemented off-chip.

System clock generator 105 (which may be a PLL circuit) generates a clock signal CLK supplied to original circuit 125 and a multiple of redundant circuits 125A through 125N and to clock cycle counter 110. Clock cycle counter 110 keeps a running tally of the number of clock cycles that have occurred since the last power up after the last clock cycle counter RESET signal. A RESET signal is generated by repair processor 115 in response to a COUNTA signal sent from the clock cycle counter 110 and received by repair processor 115 that triggered a repair event. Repair processor 115 has the capability of performing all the tasks and generating all the signals required to affect a circuit repair. The current clock cycle count is stored in counter memory 130 and used to generate a CLOCKB signal. Since this count should be resumed at power up, counter memory 130 should be a non-volatile type memory such as non-volatile random access memory (NVRAM), which will save the value of the count when the chip is powered down. Clock cycle counter 110 has the capability of restoring its count prior to a power down at a subsequent power up and continue counting clock cycle count from the restored count.

The first time repair processor receives a COUNTA triggering a replacement, original circuit 125 is replaced by redundant circuit 125A. RESET signal is then generated causing cycle clock counter 110 to reset its count to zero clock cycles. The next time COUNTA reaches a value that triggers a replacement, redundant circuit 125A is replaced by a subsequent redundant circuit in the set of redundant circuits 125A through 125N. COUNTA and COUNT B may be the same signal, or different signals as discussed infra. Repair processor 115 may affect replacement directly or by electrically blowing fuses in fuse bank 120, the pattern created by the states of the fuses directing inputs and outputs of the replaced circuit and the replacement circuit as required. However, any method of affecting repair may be used, including methods requiring the off chip storage of the current repair status of integrated circuit 100, so it can be restored at power up.

Figure 2:
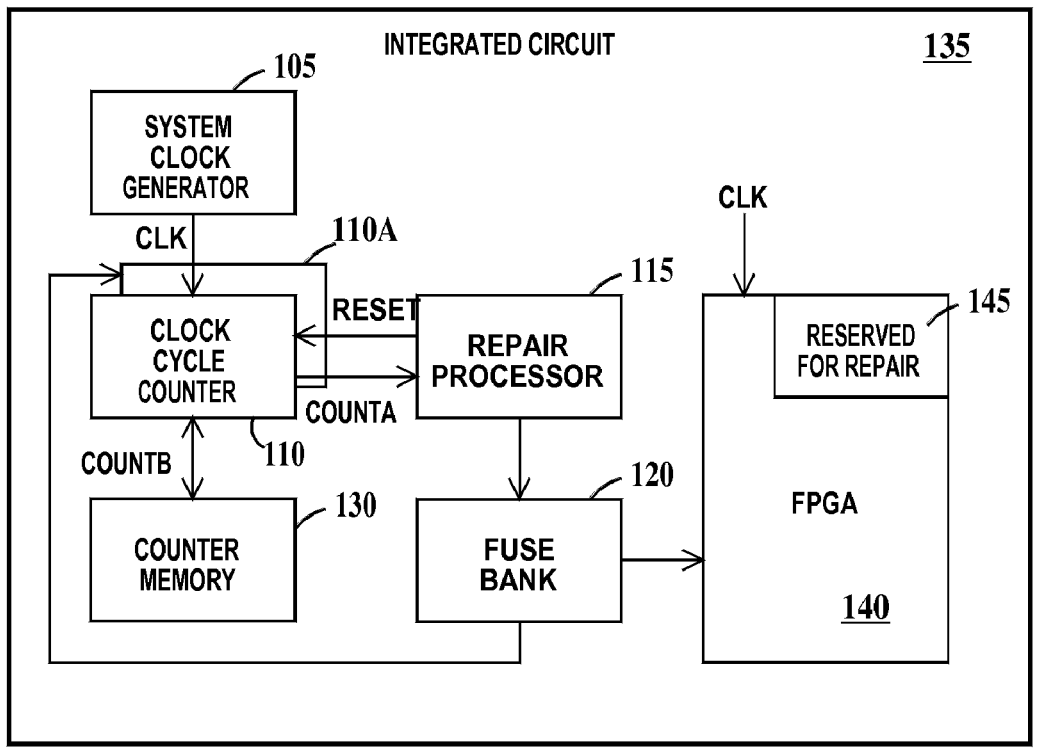
FIG. 2 is a schematic block diagram of an integrated circuit according to a second embodiment of the present invention.

It should be noted, that clock cycle counter 110 may be repairable using the present invention. To this end, repair processor 115 can automatically insert redundant clock cycle counter 110A between system clock generator 105, memory counter 130 and the repair processor itself in place of clock cycle counter 110 when a predetermined number of clock cycles are reached. This pre-determined number of clock cycles should be significantly less than the COUNTA signal value. More than one redundant clock cycle counter may be provided and this process may be repeated as many times as there are redundant repair processors FIG. 2 is a schematic block diagram of an integrated circuit according to a second embodiment of the present invention. In FIG. 2, integrated circuit 135 is similar to integrated circuit 100 of FIG. 1, except original circuit 125 and redundant circuits 125A through 125N of FIG. 1 are replaced with a field programmable gate array (FPGA) 140.

A portion 145 of FPGA 140 is reserved for use as replacement gates to form a replacement circuit for a function performed by FPGA 140.

In the simplest approach, COUNTA and COUNTB are conveyed by buses between clock cycle generator 110 and repair processor 115 and between clock cycle counter 110 and counter memory 130 that are as wide as an internal counter within the clock cycle counter. However, a simple calculation shows that this approach requires a large number of wires, especially when multiple repair processors are distributed around the integrated circuit. For example, given a 10 GHz clock frequency and 10 years of power on operation requires a counter capable of counting 3.16E18 clock cycles. The base 2 log of 3.16E18 is 62, so a 62-bit counter is required as well as a 62-bit bus. Reducing the operating frequency to 1.25 GHz only reduces the counter to 58-bits. A way of reducing the bus width and the associated circuit complexity is to employ most significant bit (MSB) sampling in the repair processor. This approach is illustrated in FIGS. 3 and 4 and described infra.

Figure 3:
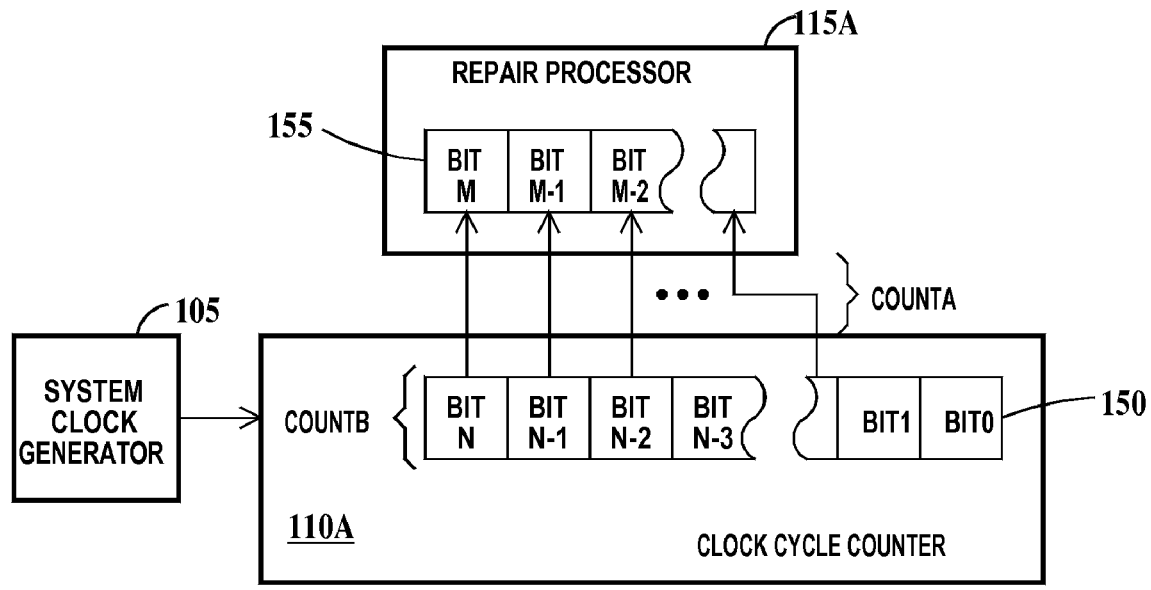
FIG. 3 is a diagram illustrating a first circuit implementation of the present invention.

FIG. 3 is a diagram illustrating a first circuit implementation of the clock cycle counter, repair processor and system clock generator components disclosed in the present invention. In FIG. 3, a clock cycle counter 110A includes an N+1 bit register 150, which holds the current value of COUNTB. Register 150 is sized to hold the maximum number of clock cycles to be counted. A repair processor 115A includes an M+1 bit register 155, which holds the current value of COUNTA. The last M-bits in register 150 are connected to corresponding bit positions in register 155. M can be much smaller than N since repair processor 115A does not need to known the exact clock cycle count but only what fraction of the maximum value of COUNTB has been reached. For example, if M=3 and the bits in register 155 are 0 0 0 1, then $\frac{1}{16}$ of the maximum number of clock cycles has been reached. When the bits in register 155 are 1 0 0 0 then 2 of the maximum number of clock cycles has been reached. Repair processor 115A can either be designed to react to any single bit of the M-bits of register 155 toggling, or to a pattern of all M-bits. Thus, only an M-bit wide bus is required. The particular set of M-bits selected from register 150 need not include the highest bits.

Figure 4:
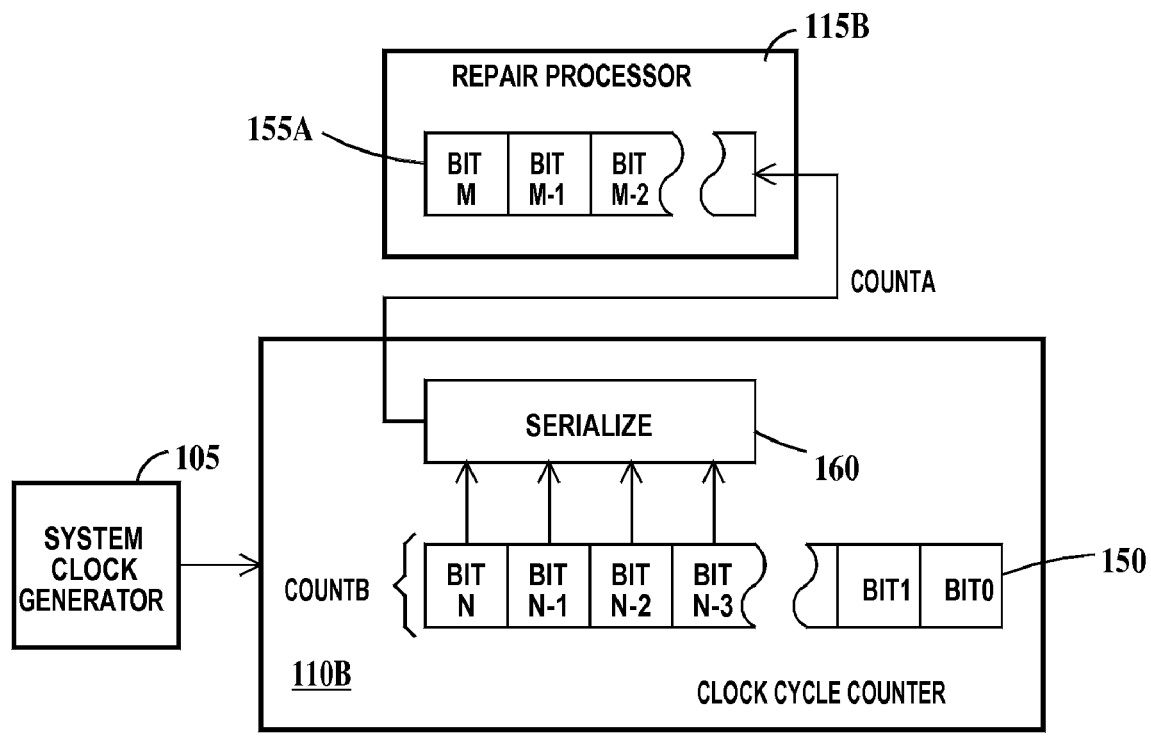
FIG. 4 is a diagram illustrating a second circuit implementation of the present invention.

FIG. 4 is a diagram illustrating a second circuit implementation of the clock cycle counter, repair processor and system clock generator disclosed in the present invention. In FIG. 4, a clock cycle counter 110B is similar to clock cycle counter 110A of FIG. 3 except for the addition of a serialization circuit 160, which takes the M-bits and generates a coded digital signal (COUNTA) that can be distributed by a single wire. Also, a repair processor 115B is similar to repair processor 115A of FIG. 3, except for register 155A being a shift register.

The approach to serialization of COUNTA can be expanded to serialize COUNTB in order to avoid the need for a multi-wire bus between clock cycle counter 110 and counter memory 130, particularly in the case when the counter memory is off-chip.

Figure 5:
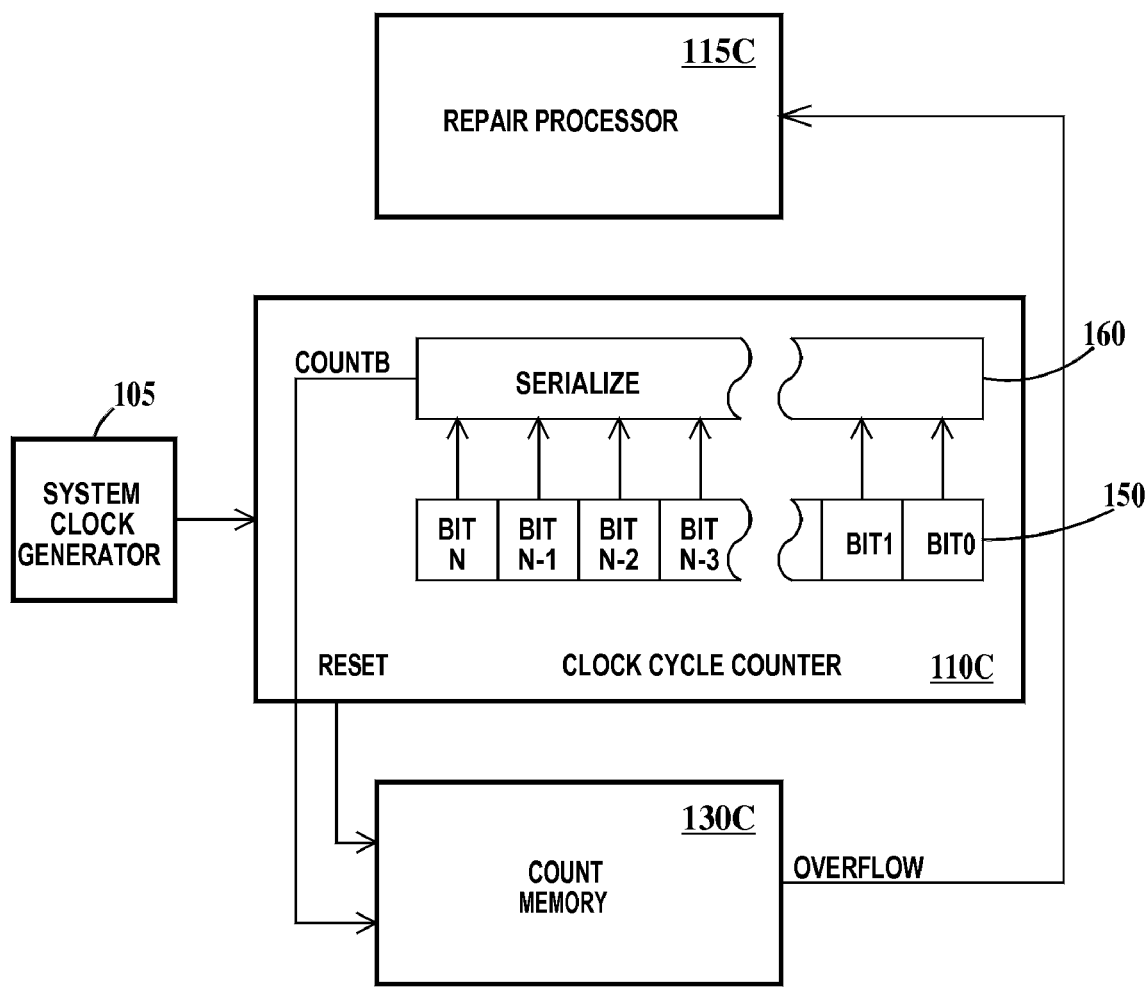
FIG. 5 is a diagram illustrating a third circuit implementation of the present invention.

FIG. 5 is a diagram illustrating a third circuit implementation of the present invention, excluding the circuits selected for redundancy coverage and their redundant counterparts. In FIG. 5, a counter 110C is similar to counter 110B of FIG. 4 except a serialization circuit 160 converts the entire contents of register 150 into a coded digital signal (COUNTB) that is connected to count memory 130C. Count memory 130C can be adapted to generate an overflow signal OVERFLOW to a repair processor 115C in order to initiate a repair event.

Instead of using OVERFLOW to trigger a repair event, the M-bit COUNTA bus and attendant registers of FIG. 3 or serialized COUNTA bus and attendant registers of FIG. 4 may also be used.

Figure 6:
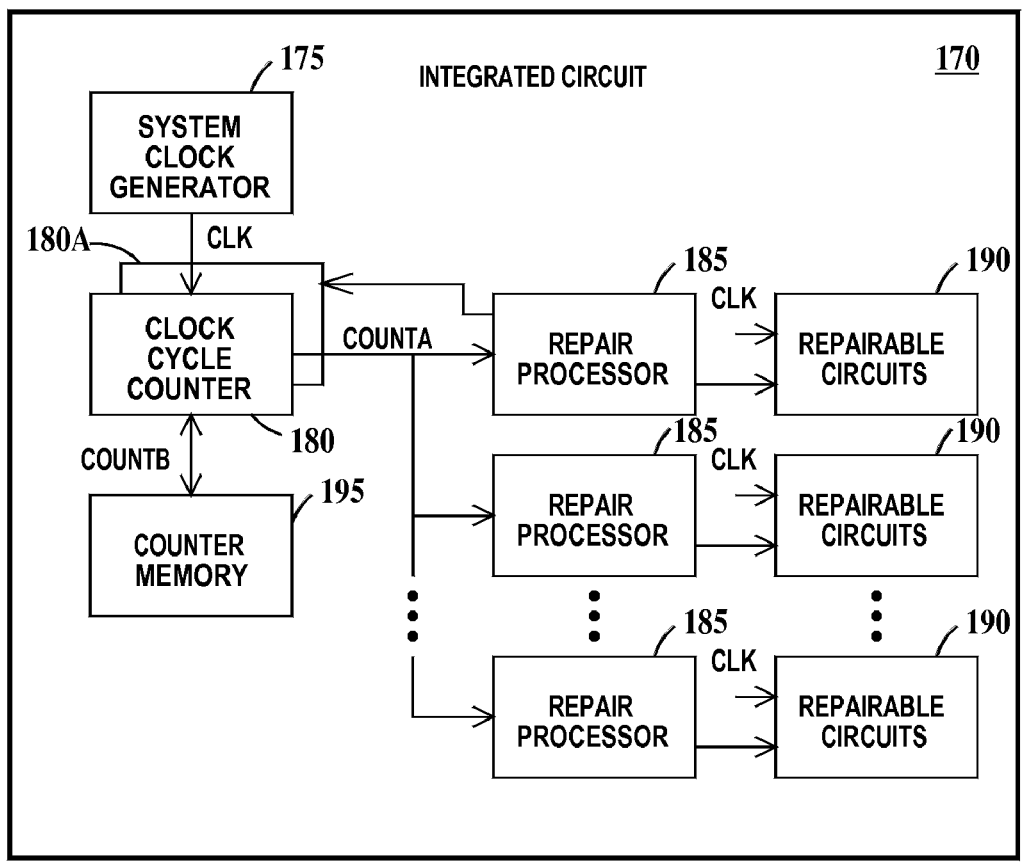
FIG. 6 is a schematic block diagram of an integrated circuit according to a third embodiment of the present invention.

FIG. 6 is a schematic block diagram of an integrated circuit according to a third embodiment of the present invention. In FIG. 6, an integrated circuit chip 170 includes a system clock generator 175, a clock cycle counter 180, a redundant clock cycle counter 180A, a multiple repair processors 185 and corresponding repairable circuits 190, each repairable circuit including an original circuit and one or more replacement circuits. Additionally, integrated circuit 170 may include an on-chip count memory 195 for storing the cumulated number of clocks counted by clock cycle counter 180, or an off-chip memory may be use for this purpose. In the third embodiment of the present invention, a single clock cycle counter 180 serves multiple repair processors 185. However, since the number of clock cycles required to trigger a replacement event can vary among repair processors 185, there is no RESET signal and a means for each repair processor 185 to determine when to trigger a repair event must be included within each repair processor.

Figure 7:
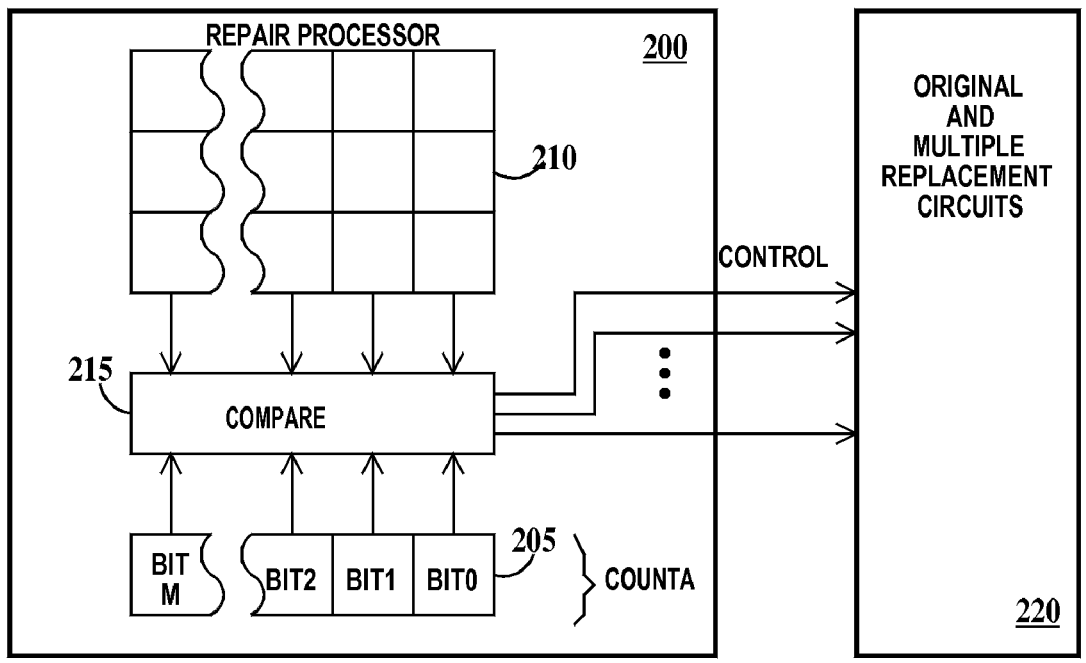
FIG. 7 is a diagram illustrating a fourth circuit implementation of the present invention.

FIG. 7 shows a fourth circuit implementation of the present invention, wherein multiple repair processors are triggered by different clock cycle counts and multiple times to effect multiple repairs. In FIG. 7, repair processor 200 includes a register 205 for receiving an M-bit COUNTA signal as described supra. Repair processor 200 is also provided with a memory 210 which may be an FPGA or a fuse bank that stores sets of bits corresponding to one or more clock cycle counts on which a repair event should occur. A comparator 215 compares the contents of register 205 with all the sets of data bits stored in memory 210 and triggers the appropriate control signals to replacement circuits 220.

Figure 8:
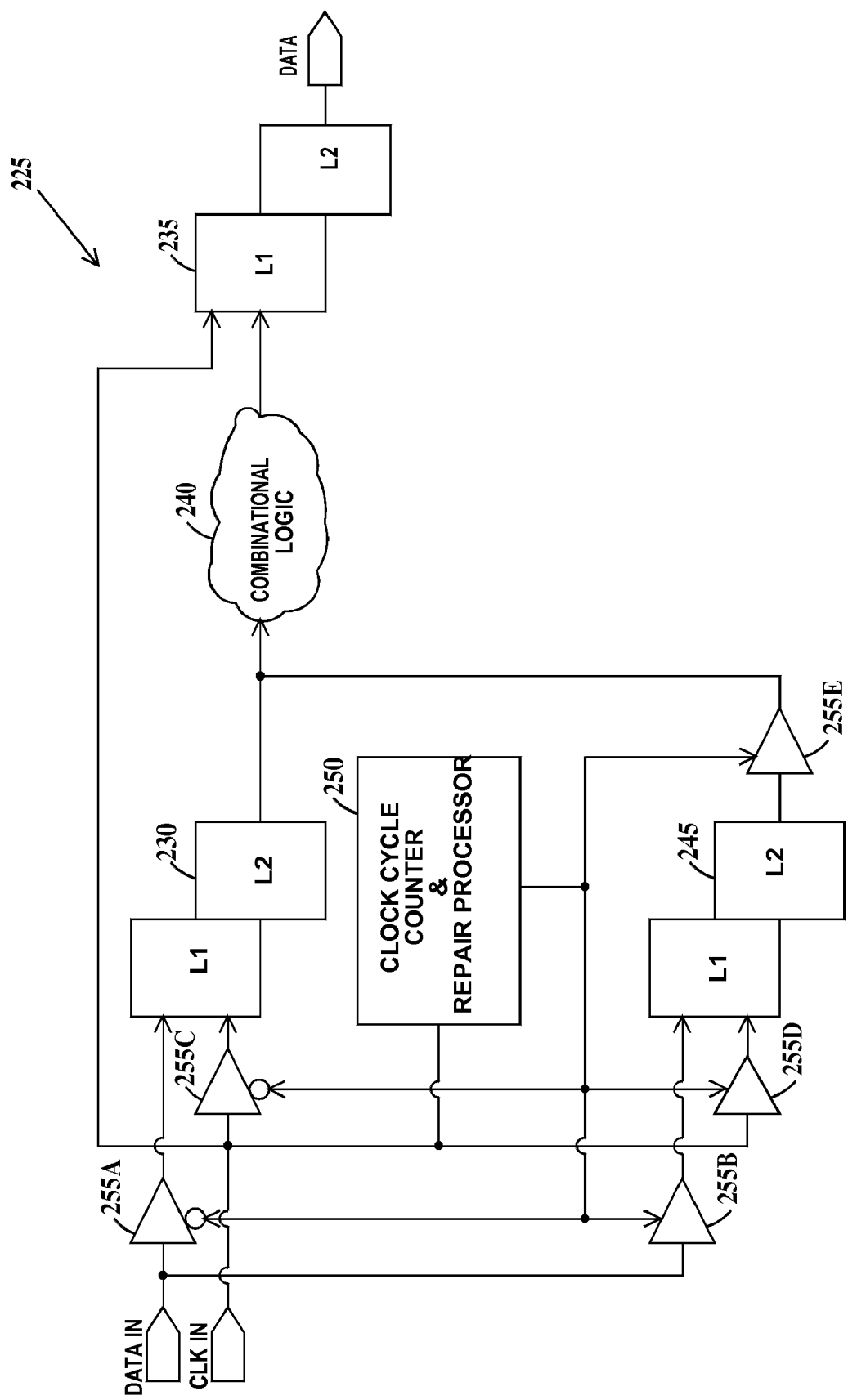
FIG. 8 is a schematic diagram of a first exemplary circuit utilizing the present invention.

FIG. 8 is a schematic diagram of a first exemplary circuit utilizing the present invention. In FIG. 8, a redundant latch circuit 225 includes a sending latch 230 connected to a receiving latch 235 through combinatorial logic 240, a redundant latch 245, a clock cycle counter and repair processor 250 and multiple tristate buffers 255A, 255B, 255C, 255D and 255E. Clock cycle counter and repair processor 250 may include one or more redundant clock cycle counters. Tristate buffer is 255A is inserted in the DATA path between DATA IN and sending latch 230 and tristate buffer 255C is inserted in the CLK path between CLK IN and sending latch 230. Tristate buffer is 255B is inserted in the DATA path between DATA IN and redundant latch 245 and tristate buffer 255D is inserted in the CLK path between CLK IN and redundant latch 245. Tristate buffer 255E is inserted in the data path between redundant latch 255E and combinational logic 240.

Depending on the number of elapsed clock cycles, clock cycle counter and repair processor 250 generates a CONTROL signal that either turns on tristate buffers 255A and 255C in order to pass DATA and CLK signals respectively to sending latch 230 and turns off tristate buffers 255B, 255D and 255E or turns on tristate buffers 255B and 255D in order to pass DATA and CLK signals respectively to redundant latch 245 and connect redundant latch 245 to combinational logic 240 and turns off tristate buffers 255A and 255C. Tristate buffers 255A, 255B, 255C, 255D and 255E may be replaced by 2:1 multiplexers.

Figure 9:
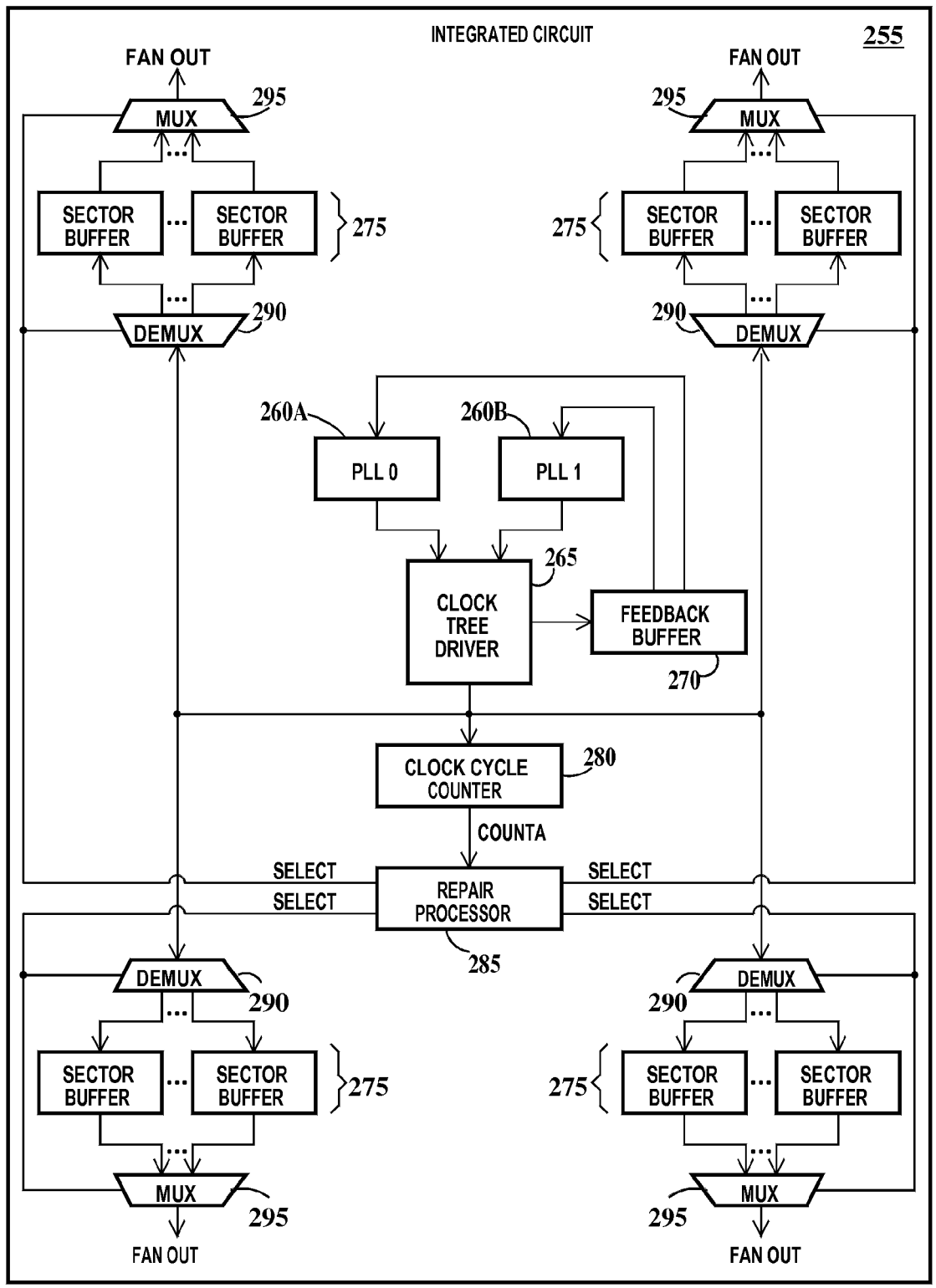
FIG. 9 is a schematic diagram of a second exemplary circuit utilizing the present invention.

FIG. 9 is a schematic diagram of a second exemplary circuit utilizing the present invention. In FIG. 9, an integrated circuit 255 includes a first PLL circuit 260A and a second PLL circuit 260B, each designed to generate clocks of different frequencies, a central clock tree driver 265, a feedback buffer 270 designed to emulate the silicon and wire delay through a complete path in the tree, and four of sector buffer sets 275 used to drive the system clock through more local areas of the chip. Integrated circuit 255 further includes a clock cycle counter 280, a repair processor 285, four de-multiplexers 290 and four multiplexers 295 in order to implement sector buffer replacement. Clock cycle counter 280 may include redundant clock cycle counters. There is one de-multiplexer 290 and one multiplexer 295 associated with each sector buffer set 275. Each multiplexer 295 feeds a fan out to drive multiple local clock regenerators (not shown).

PLL circuits 260A and 260B are selectable to drive clock tree driver 265. Feedback circuit 270 allows the PLL circuits to matches the RC and silicon delay of the clock tree. Clock tree driver 265 provides a CLK signal to each de-multiplexer 290 and to clock cycle counter 280. Clock cycle counter 280 supplies a COUNTA signal to repair processor 285, which in turn provides SELECT signals to de-multiplexers 290 and multiplexers 295. The SELECT signal Aswitches@ out an Aold@ sector buffer and switches in a Anew@ sector buffer. Clock cycle counter 280 and repair processor 285 may be implemented by any of the methods described supra.

Figure 10:
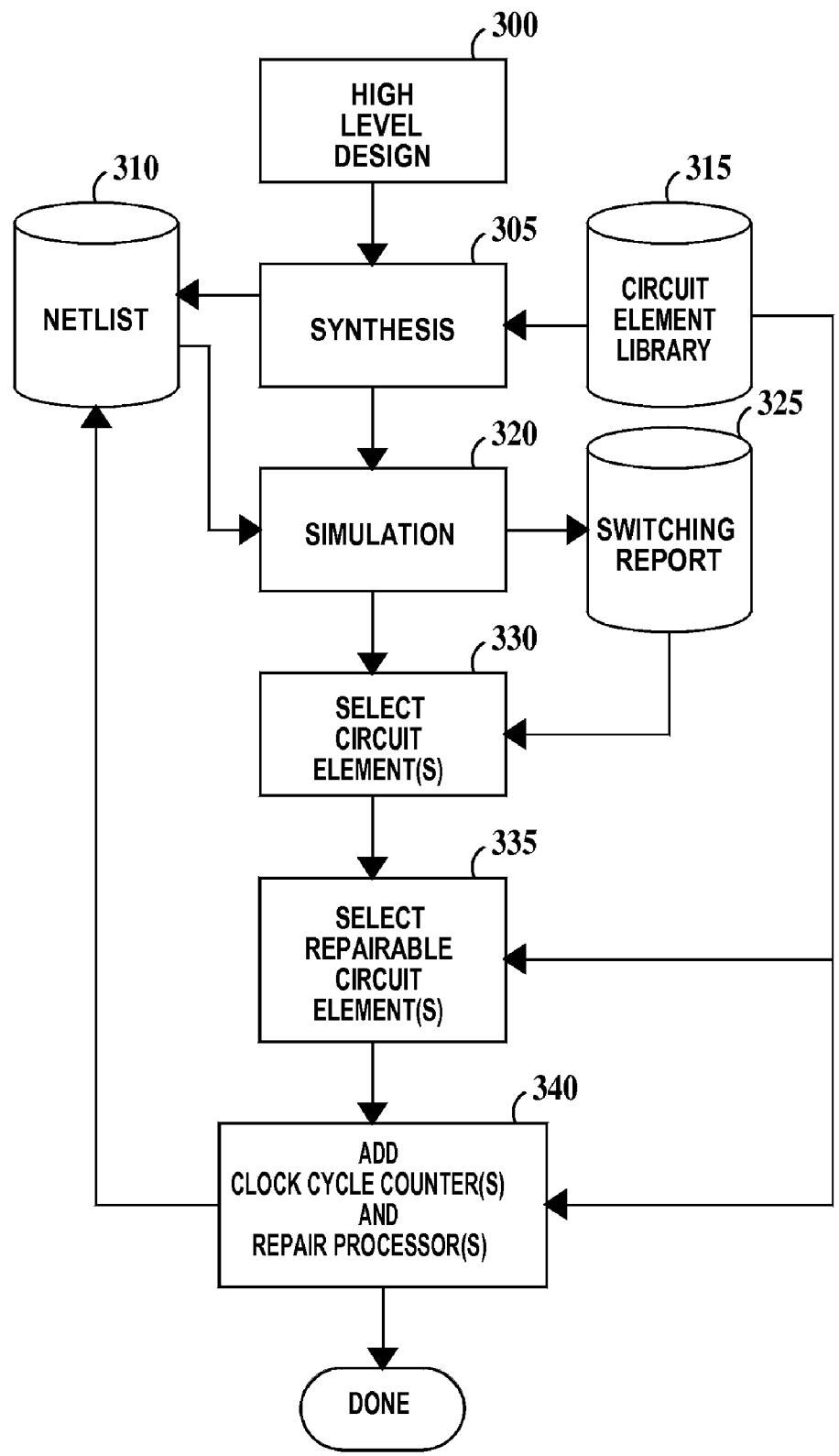
FIG. 10 is a flowchart illustrating a method of designing an integrated circuit according to the present invention.

FIG. 10 is a flowchart illustrating a method of designing an integrated circuit according to the present invention. In step 300, a high level design (HLD) of the integrated circuit is completed. In step 305, design synthesis is performed in order to generate a netlist 310 of the HLD from a library 315 of circuit elements. In step 320 simulation of the netlist design is performed. As part of the simulation, a switching report 325 is generated. Switching report 325 lists the total number of state toggles (input and/or output signal level changes) each circuit element made during the simulation.

In step 330, switching report 325 is used to select potential circuit elements that could potentially Awear out@ based on the switching factor or transition density of each circuit element as reported in switching report 325, a predetermined degradation rate per transition, a power on time specification and an acceptable degradation specification. The degradation rate may be a function of the voltage level switched by the circuit element and may be process technology dependent.

In step 335, repairable circuit elements having the same function as the circuit elements selected in step 330 but including AND/OR legs, are selected from design library 315. The repairable elements may have N sets of AND/OR legs in order that multiple Arepairs@ can be performed. In step 340, the automatic synthesis tool adds one or more clock cycle counter and one or more repair processors, which are selected from design library 315. The automated synthesis tool adds structures that connect the clock cycle counters, repair processors and repairable circuit elements in a method similar to the method used to building clock tree structures.

Generally, the method described herein with respect to designing an integrated circuit having a digital reliability monitor having autonomic repair and notification capability is practiced with a general-purpose computer and the method may be coded as a set of instructions on removable or hard media for use by the general-purpose computer.

Figure 11:
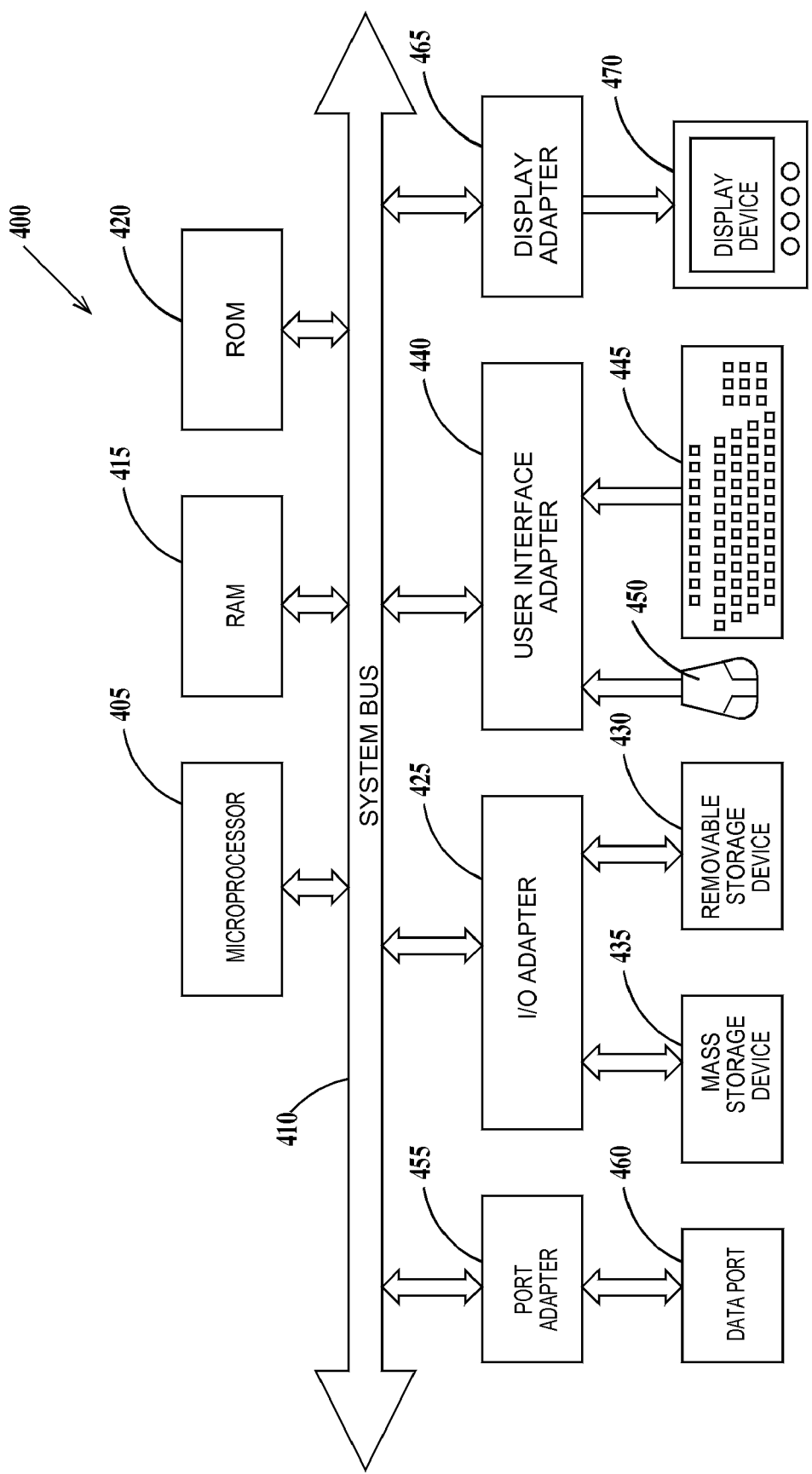
FIG. 11 is a schematic block diagram of a general-purpose computer for practicing the present invention.

FIG. 11 is a schematic block diagram of a general-purpose computer for practicing the present invention. In FIG. 11, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface may be created by one skilled in the art and stored on the system or a data and/or program storage device to simplify the practicing of this invention. In operation, information for the computer program created to run the present invention is loaded on the appropriate removable data and/or program storage device 430, fed through data port 460 or typed in using keyboard 445.

For the purposes of describing the present invention hereafter, an original circuit is defined as digital or analog circuit, a memory circuit, a latch, a group of logic gates, a logic gate or a device (such a transistor, a diode, a resistor, a capacitor, an inductor or a wire). A redundant circuit is defined as a circuit having the same logical function of the original circuit and about the same expected lifetime under identical operating conditions as the original circuit. A robust redundant circuit is defined as a circuit having the same logical function of the original and a greater expected lifetime under identical operating conditions as the original circuit.

Figure 12:
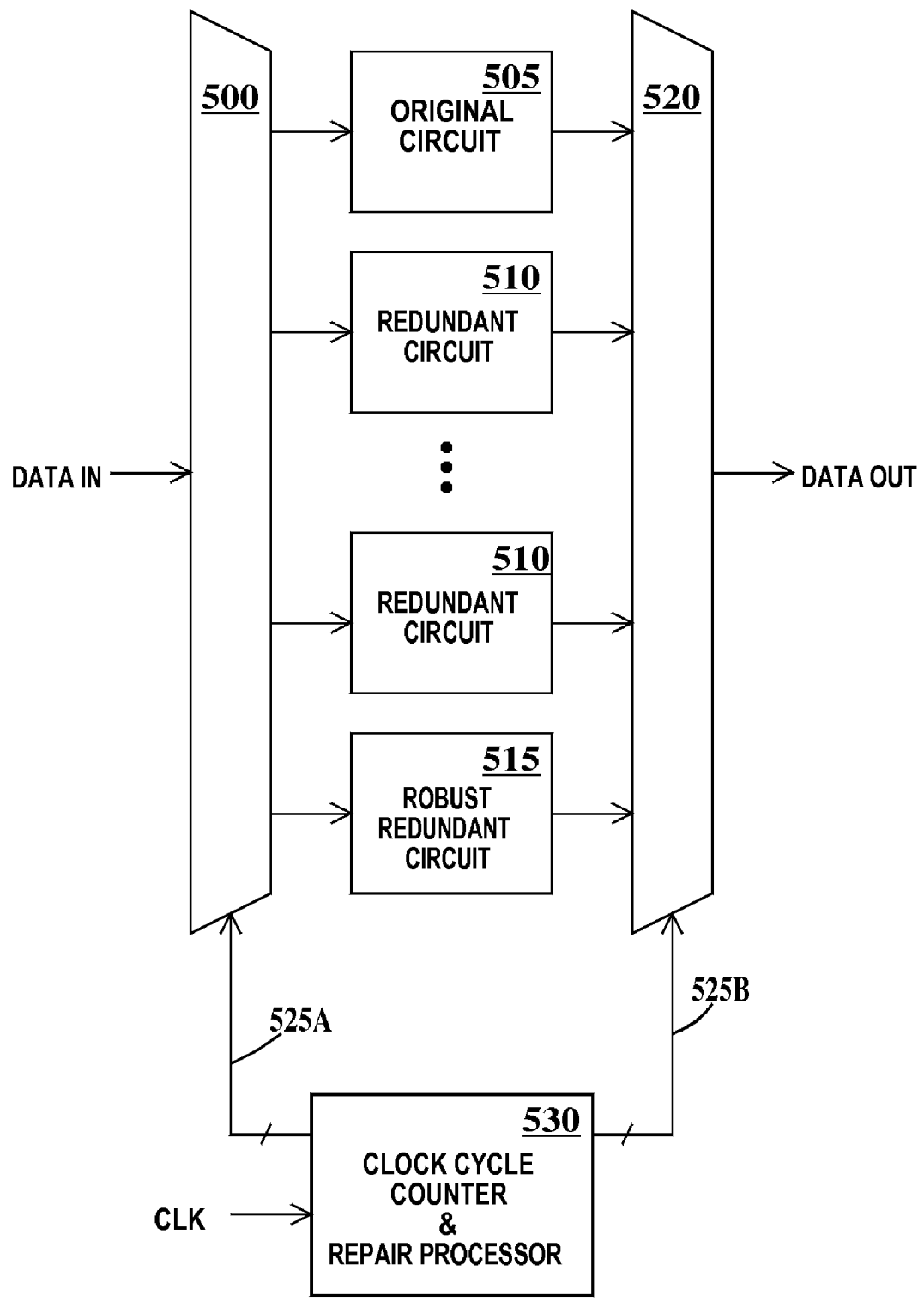
FIG. 12 is a schematic block diagram of an integrated circuit according to a fourth embodiment of the present invention.

FIG. 12 is a schematic block diagram of an integrated circuit according to a fourth embodiment of the present invention. In FIG. 12, a data in signal is applied to the input of a multiplexer 500. The inputs of an original circuit 505, a multiplicity of redundant circuits 510 and a robust redundant circuit 515 are each connected to a different output of multiplexer 500. The output of original circuit 505, of redundant circuits and robust redundant circuit 515 are each connected to a different input of demultiplexer 520. The output of demultiplexer 520 is a data out signal. Multiplexer 500 and demultiplexer 520 are responsive to control signals 525A and 525B generated by a clock cycle counter and repair processor 530 that are applied respectively to the control inputs of multiplexer 500 and demultiplexer 520. Clock cycle counter and repair processor 530 receives a CLK signal.

In operation, when clock cycle counter and repair processor 530 counts a predetermined number of clock cycles, control signals 525A and 525B applied to multiplexer 500 and demultiplexer 520 respectively trigger replacement of original circuit 505 with a redundant circuit 510 in the data path data in/data out. After additional predetermined numbers of clock cycles, each redundant circuit is in turn replaced with another redundant circuit. Finally, when no more redundant circuits are available, the last redundant circuit 510 is replaced with robust redundant circuit 515 and clock cycle counter may or may not be turned off. In any event, no further switching in and out of redundant circuits 515 occurs.

Robust redundant circuit 515 has the identical circuit function as original circuit 505 but differs in physical structure or operating parameters such that the lifetime of robust redundant circuit 515 significantly exceeds the expected life time of the original circuit (or any of the redundant circuits) but at a cost of reduced performance. It would be desirable for the lifetime of robust redundant circuit 515 to exceed the lifetime of the device or integrated circuit chip in which it is incorporated. For example, robust redundant circuit 515 may use longer channel length transistors, transistors with thicker gate oxide or transistors having higher threshold voltages, all of which reduce the stress on the gate oxide of transistors comprising robust redundant circuit 515, but slow the switching speed of the transistors.

Figure 13:
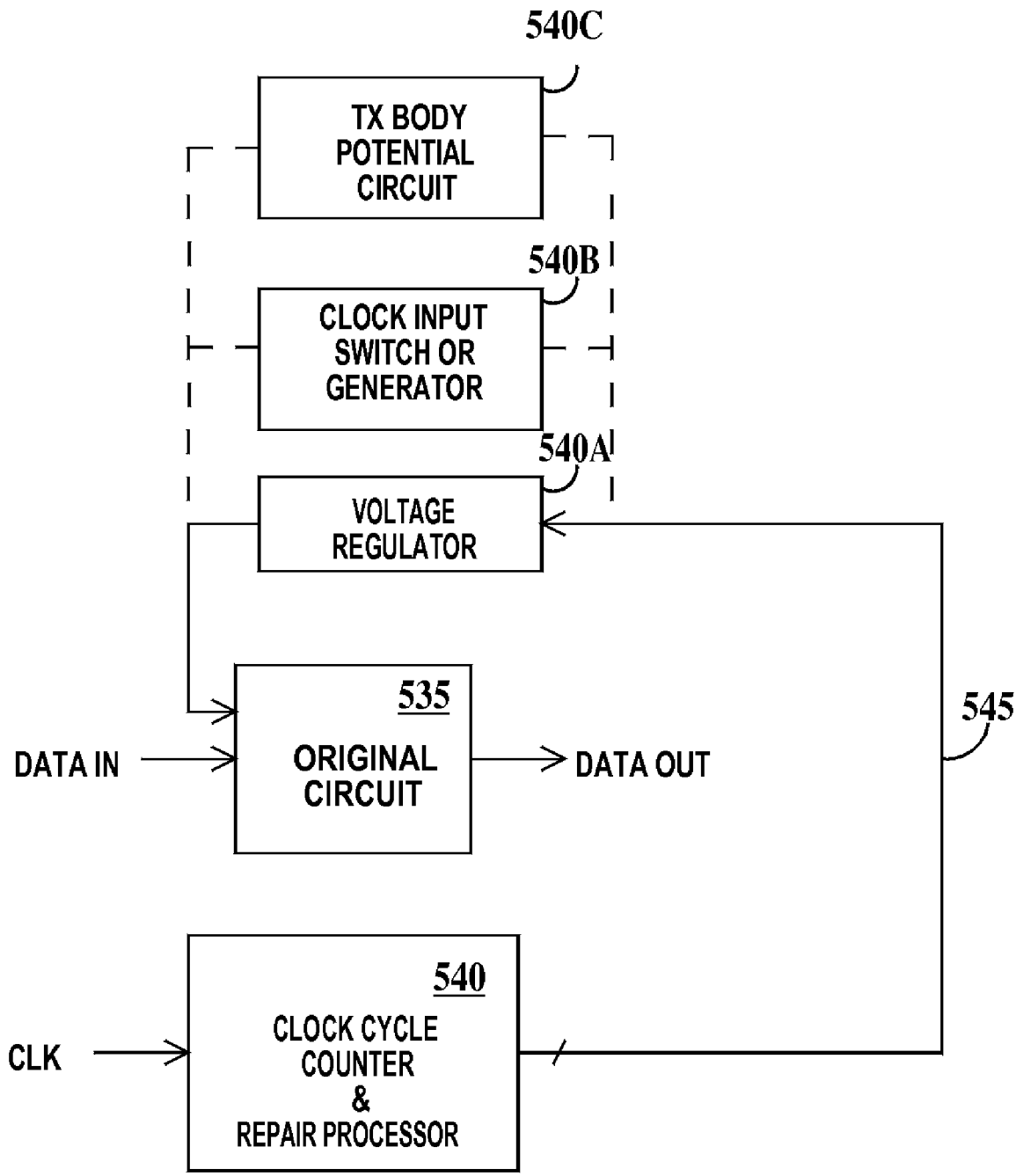
FIG. 13 is a schematic block diagram of an integrated circuit according to a fifth embodiment of the present invention.

FIG. 13 is a schematic block diagram of an integrated circuit according to a fifth embodiment of the present invention. In FIG. 13, an original circuit 535 receives a data in signal and generates a data out signal and is supplied with power through a voltage regulator 540A. When a clock cycle counter and repair processor 540 counts a predetermined number of clock cycles, a control signals 545 is generated that lowers the output voltage of voltage regulator 540A controlling the rail voltages of original circuit 535, thus reducing the stress on the gate oxide of transistors of original circuit 535 and extending its lifetime.

Any operating parameter of original circuit 535 may be controlled by clock cycle counter and repair processor 540. For example, voltage regulator 540A may be replaced by a clock input switch or clock generator and control signal 545 would reduce the CLK frequency that original circuit 535 is running at, thus reducing the rate of transistor switching of the original circuit and extending its lifetime (in terms of time not duty cycles). In another example, voltage regulator 540A may be replaced by a TX body potential circuit and control signal 545 lowers the transistor body potential of transistors making up original circuit 535, thus reducing the stress on the original circuit and extending its lifetime. It is possible to change rail voltages, frequencies and body potential several times and it is possible to hard wire into clock cycle counter and repair processor 540 the ability to implement changes in rail voltage, body potential and CLK frequency in a predetermined sequence or in predetermined combinations.

Figure 14:
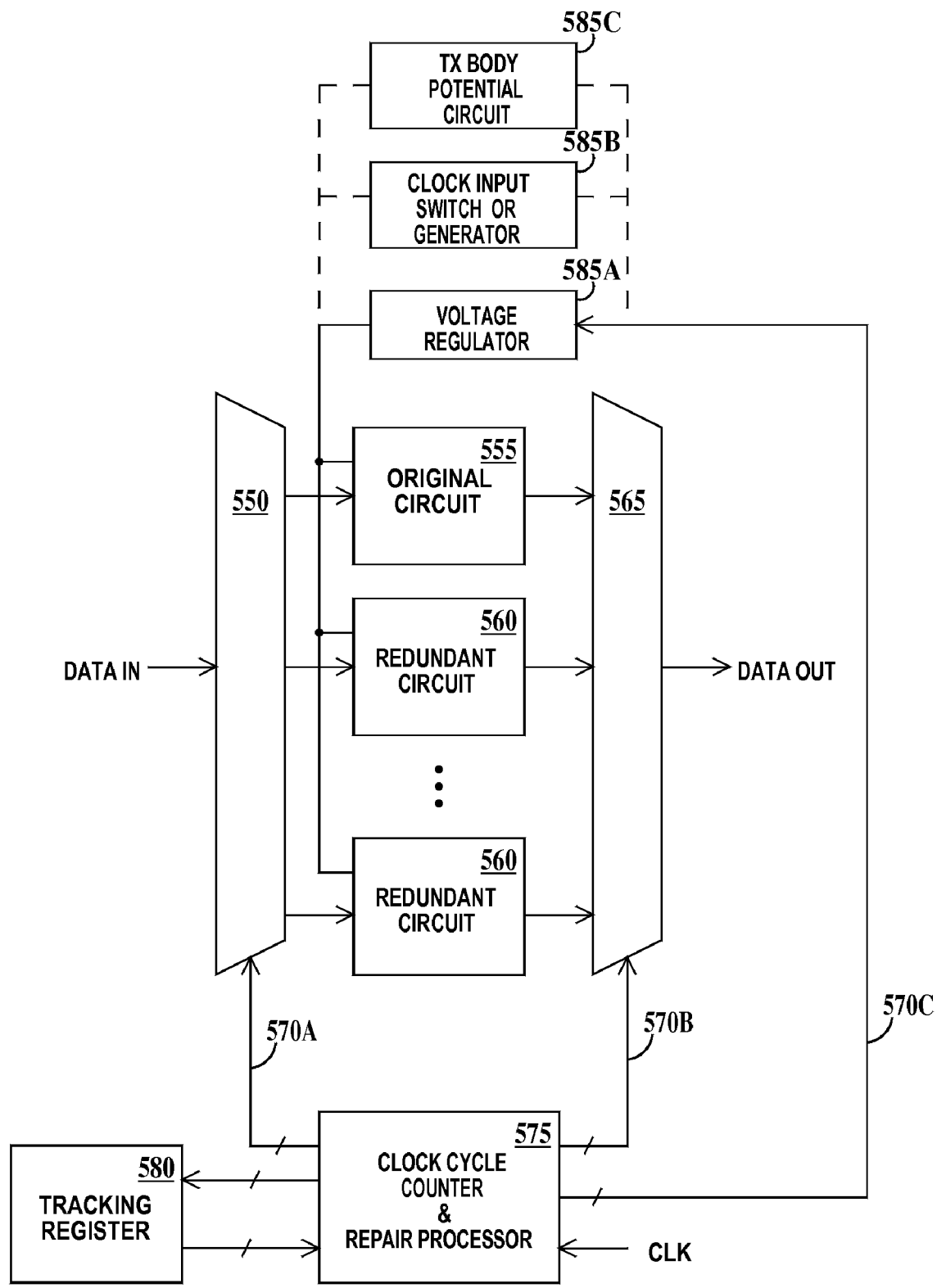
FIG. 14 is a schematic block diagram of an integrated circuit according to a sixth embodiment of the present invention.
Figure 16:
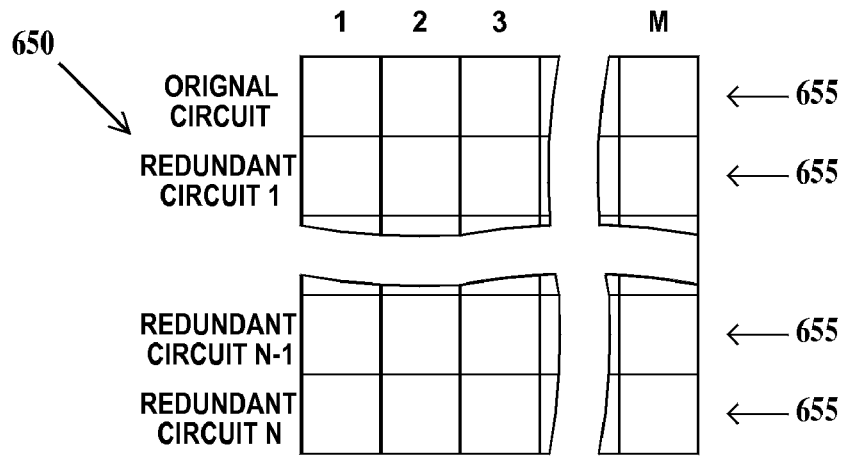
FIG. 16 is an illustration of the tracking register function according to the present invention.

FIG. 14 is a schematic block diagram of an integrated circuit according to a sixth embodiment of the present invention. The sixth embodiment of the present invention combines the fourth and fifth embodiments of the present invention as well as optionally adding the concept of tracking the repairs (replacements) performed. In FIG. 14, a data in signal is applied to the input of a multiplexer 550. The inputs of an original circuit 555 and a multiplicity of redundant circuits 560 are each connected to a different output of multiplexer 550. The output of original circuit 555 and of redundant circuits 560 are each connected to a different input of demultiplexer 565. The output of demultiplexer 565 is a data out signal. Multiplexer 550 and demultiplexer 565 are responsive to control signals 575A and 575B generated by a clock cycle counter and repair processor 575 that are applied respectively to the control inputs of multiplexer 550 and demultiplexer 565. Clock cycle counter and repair processor 575 receives a CLK signal. Clock cycle counter and repair processor 575 is connected to a tracking register 580 to which the clock cycle counter and repair processor can write information about what repairs or replacements have already occurred and read that information as well. The logical structure of a tracking register is illustrated in FIG. 16 and described infra.

Original circuit 550 and redundant circuits 560 are connected to a voltage regulator 585A for controlling the rail voltage of the original and redundant circuits, and/or a clock input switch or generator 585B for controlling the CLK frequency the original and redundant circuits, and/or a transistor body potential circuit 585C for controlling the transistor body potential of transistors making up the original and redundant circuits and/or combinations thereof. Voltage regulator 585A and/or clock input switch and/or generator 585B and/or transistor body potential circuit 585C are responsive to a control signal 570C generated by clock cycle counter and repair processor 575.

In operation, after all redundant circuits 560 have been cycled through (in response to predetermined clock counts), either original circuit 555 is re-inserted into the data path, data in to data out, and adjustment made to the rail voltage, CLK frequency or body potential (or combinations thereof), or the original and redundant circuits are reused sequentially at the same time adjustment is made to the rail voltage, CLK frequency or body potential (or combinations thereof).

Though not illustrated, the circuit of FIG. 14 may include a robust redundant circuit that is switched in after all other options have been exhausted. Further, voltage regulator 585A, clock input switch or generator 585B and transistor body potential circuit 585C should be considered as exemplary of a circuit or device that changes an operating parameter of original circuit 555 and redundant circuits 560 in order to reduce stress and increase the lifetime of original circuit 555 and redundant circuits 560 and other circuits or devices for reducing stress may be substituted.

Figure 15:
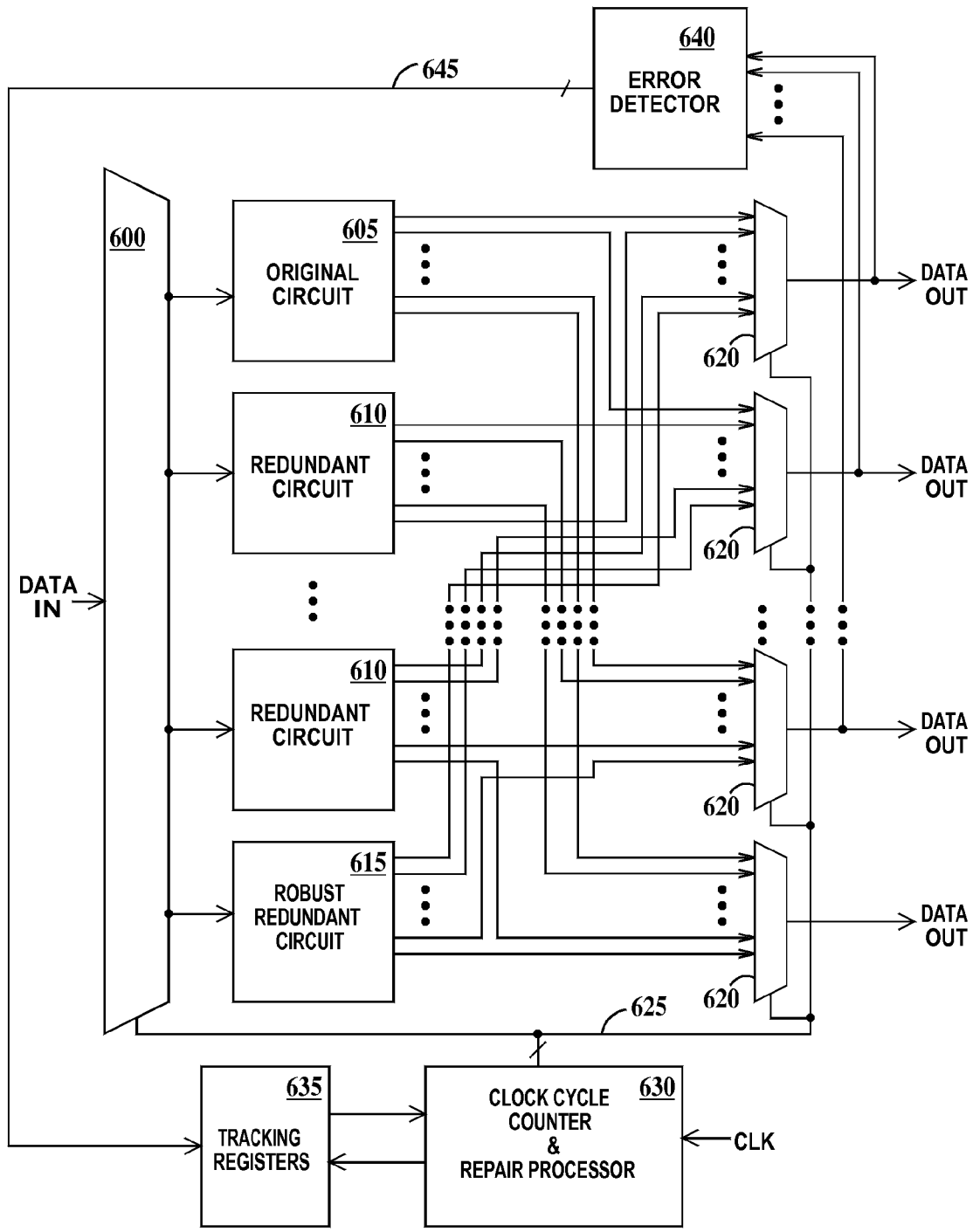
FIG. 15 is a schematic block diagram of an integrated circuit according to a seventh embodiment of the present invention.

FIG. 15 is a schematic block diagram of an integrated circuit according to a seventh embodiment of the present invention. The seventh embodiment of the present invention takes into account, that the original circuits as well as redundant circuits that have been inserted into and then removed from the data path data in/data out still have some lifetime (in terms of transistor switching cycles) left because the circuits were switched out before failure. In FIG. 15, a data in signal is applied to the input of a multiplexer 600. The inputs of an original circuit 605, of a multiplicity of redundant circuits 610 and a robust redundant circuit 615 are each connected to a different output of multiplexer 600. The output of original circuit 605 and of redundant circuits 610 are each connected to a different input of each of a multiplicity of demultiplexers 620. The output of demultiplexers 620 are data out signals. Multiplexer 600 and demultiplexers 620 are responsive to a control signals 625 generated by a clock cycle counter and repair processor 630 that is applied to the control inputs of multiplexer 600 and demultiplexers 620. Clock cycle counter and repair processor 630 receives a CLK signal. Clock cycle counter and repair processor 630 is connected to a tracking register 635 to which the clock cycle counter and repair processor can write information about what repairs or replacements have already occurred and read that information as well. The logical structure of a tracking register is illustrated in FIG. 16 and described infra. Each data out (except that of associated with robust redundant circuit 615) is connected to an error detector 640. Error detector 640 generates a error control signal 645 which is received and stored by tracking register 635.

In operation, after original circuit 605 and all redundant circuits 610 have been cycled through once (in response to predetermined clock counts), the original circuit and redundant circuits are re-inserted into the data path, data in to data out, provided they have not been marked as defective in tracking register 635 in response to a error event detected by error detector 640 the last time the original circuit or the particular redundant circuit was in the data path. This recycling of original circuit 605 and redundant circuits 610 may continue until the original and all redundant circuits are marked as defective in tracking register 635 or until a predetermined cycle count has been reached at which time robust redundant circuit 615 is inserted into the data path (the original and all redundant circuits being removed from the data path). Should an error occur while a redundant circuit 610 (or original circuit 605) is in the data path data in/data out but before clock cycle counter and repair processor 630 has reached a count that triggers circuit replacement, the failing circuit is at once replaced with the next non failed redundant circuit 610.

There are many methods of error detection. A few examples will be given. First, during idle time of the original or redundant circuit currently in the data path, a known stimulus may be applied at data in and the information at data out compared with an expected result. Second, the original and a redundant circuit or two redundant circuits can both be switched in together and the two different outputs compared. Third, periodically, known stimulus can be applied to the data in and the appropriate data out compared with an expected result. Fourth, the same short known stimulus can be alternated with Alive data@ and the known stimulus compared with an expected output before Alive@ data is processed. If error detection is performed periodically or if the error detection circuit is robust (has a longer lifetime than the lifetimes of original circuit 605 and all redundant circuits 610 combined) then failure of error detector 640 is not a consideration. Upon detection of an error, clock cycle counter and repair processor 630 switches out the failing circuit and switches in the next circuit in sequence.

FIG. 16 is an illustration of the tracking register function according to the present invention. In FIG. 16, a tracking register 650 includes an M-bit register 655 for the original circuit and for each redundant circuit. The lowest order bit in each register 655 indicates if the corresponding circuit has failed or not.

Optionally, the higher bits in each register may be used to store the number of times the corresponding original or redundant circuit has been inserted and removed from the data path.

Figure 17:
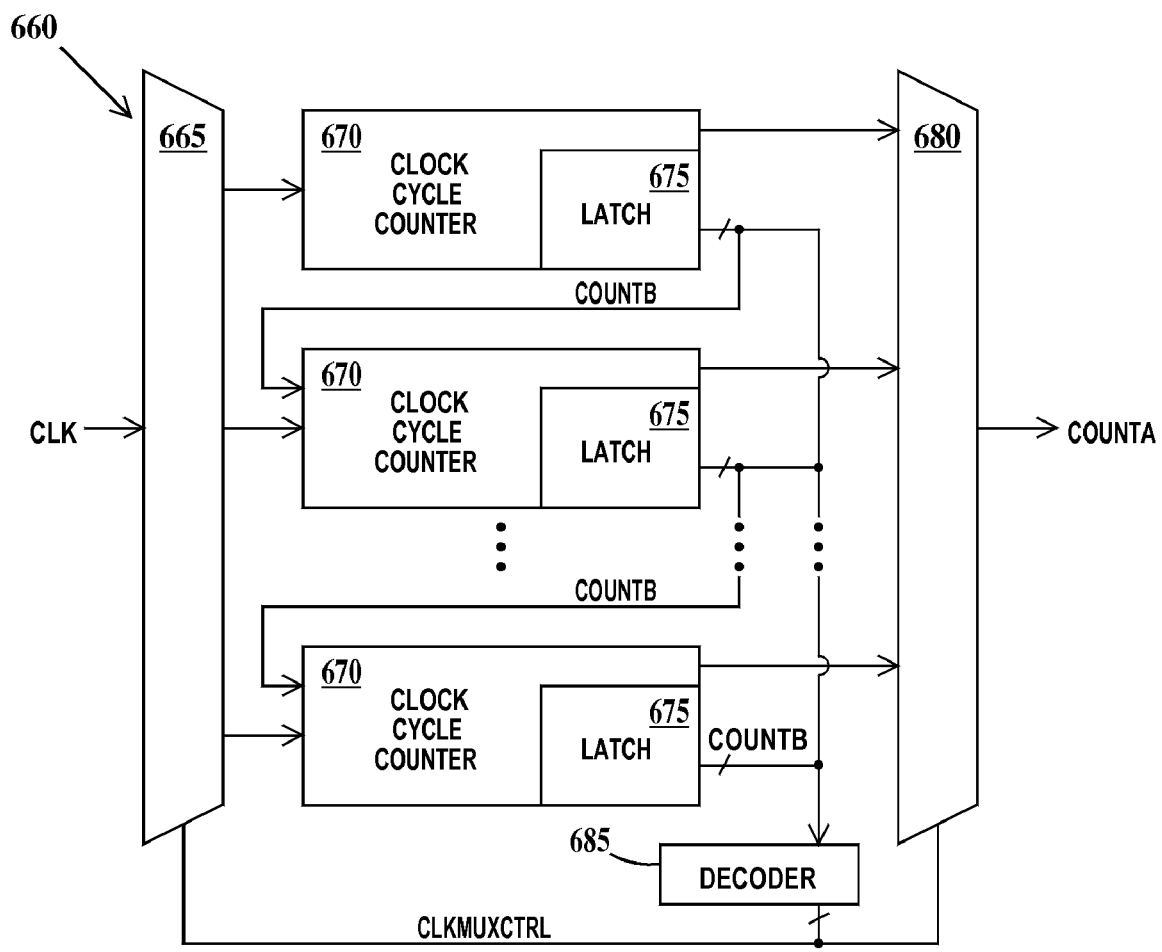
FIG. 17 is a schematic block diagram of a cycle clock counter replacement circuit according to the present invention.

FIG. 17 is a schematic block diagram of a cycle clock counter replacement circuit according to the present invention. In FIG. 17, a clock cycle counter and repair circuit 660 includes a multiplexer 665, a multiplicity of clock cycle counters 670, each having a latch 675, a demultiplexer 680 and a decoder 685. A CLK signal is received by multiplexer 665 and passed to the currently active clock cycle counter 670. As a particular clock cycle counter 670 counts, the count is latched into its latch 675, this is COUNTB as discussed supra. When the current clock cycle counter reaches a predetermined count (this is CLOCKA disccused supra), COUNTA is sent from latch 675 of the current clock cycle counter 670 to demultiplexer 680. Each clock cycle counter may generate several COUNTA signals before it needs to be replaced. When a particular clock cycle counter 670 is replaced, the contents of its latch 675, COUNTB, is sent to latch 675 of the next clock cycle counter 670 which is switched in as the previous clock cycle counter is switched out. In this way, the total number of clock cycles counted by all previous clock cycle counters is not lost and COUNTB is in effect a running total. COUNTB, going through decoder 685 generates a CLKMUXCTRL signal applied to the control inputs of multiplexer 665 and demultiplexer 680 in order to perform the actual in and out switching of specific clock cycle counters 670.

Figure 18:
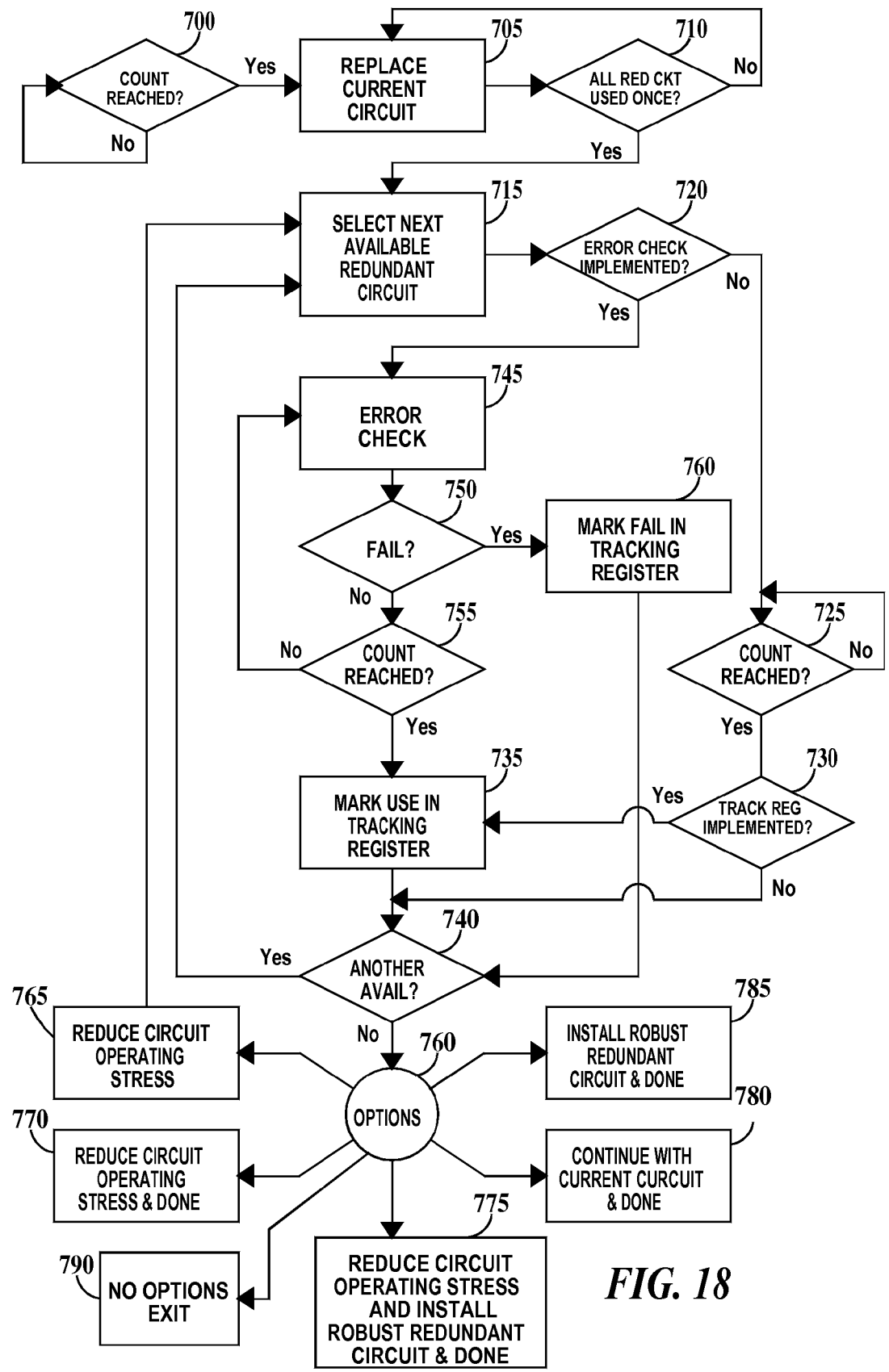
FIG. 18 is a flowchart illustrating the logic flow implemented by the fourth, fifth, sixth and seventh embodiments of the present invention.

FIG. 18 is a flowchart illustrating the logic flow implemented by the repair process portion of the clock counter and repair processor circuits in the fourth, fifth, sixth and seventh embodiments of the present invention. In step 700, it is determined if the predetermined number of clock cycles has been reached to trigger circuit replacement by the clock cycle counter. If not the method continues to count until the predetermined number of counts is reached and then the method proceeds to step 705. In step 705, the original circuit or the current redundant circuit is replaced with an unused redundant circuit. In step 710, it is determined if all redundant circuits have been used once. If not, then the method loops back step 705 otherwise the method proceeds to step 715. In step 715, the next available redundant circuit is selected. This is either the next sequential redundant circuit if error checking has not been implemented or the next non-failing redundant circuit if error checking has been implemented. This may be a redundant circuit previously installed and replaced. In step 720, if error checking has not been implemented the method proceeds to step 725. Note, if error checking is implemented then the tracking register is also implemented. In step 725, it is determined if the predetermined number of clock cycles has been reached to trigger circuit replacement by the clock cycle counter and repair processor. If not the method continues to count until the predetermined number of counts is reached and then the method proceeds to step 730. In step 730, if the tracking register has been implemented then the method proceeds to step 735, otherwise the method proceeds to step 740.

Returning to step 720, if in step 720 if error checking has been implemented the method proceeds to step 745. In step 745, an error check of the current redundant circuit is performed according to a predefined protocol, examples of which have been described supra. The current redundant circuit may or may not have operated on actual data at this point as discussed supra. Next, in step 750 it is determined if the current redundant circuit has failed. If not the method proceeds to step 755 otherwise the method proceeds to step 760 where the fail is marked in the tracking register and the method proceeds to step 740. If in step 750, the current redundant circuit has not failed then in step 755, it is determined if the predetermined number of clock cycles has been reached to trigger circuit replacement/repair by the clock cycle counter. If not the method loops back to step 745, otherwise the method proceeds to step 735.

In step 735 the latest use of the current redundant circuit is marked in the tracking register and the method proceeds to step 740.

In step 740, it is determined if another redundant circuit is available. This is either the next sequential redundant circuit if error checking has not been implemented or the next non-failing redundant circuit if error checking has been implemented. This may be a redundant circuit previously installed and replaced. If in step 740 another redundant circuit is not available then the method proceeds to step 760 where five options, depending on the circuit implementation are available, otherwise the method loops back to step 715 or exits in step 790.

If stress reduction circuits have been implemented, the method can proceed to step 765 where redundant circuit operating stress is reduced by reducing, for example, operating voltage, operating frequency and/or increasing transistor body bias and the method loop back to step 715 where redundant circuit replacement can proceed as long as there are available redundant circuits.

(2) If stress reduction circuits have been implemented, the method can proceed to step 770 where redundant circuit operating stress is reduced by reducing, for example, operating voltage, operating frequency and/or increasing transistor body bias and the method ends.

(3) If stress reduction circuits have been implemented along with a robust redundant circuit, the method can proceed to step 775 where redundant circuit operating stress is reduced by reducing, for example, operating voltage, operating frequency and/or increasing transistor body bias, the robust redundant circuit is installed and the method ends.

(4) The method can proceed to step 780 where the device/integrated circuit continues to run on its last replaced redundant circuit and the method ends.

(5) If a robust redundant circuit has been implemented, the method can proceed to step 785 where the robust redundant circuit is installed, the device continues to run on the robust redundant circuit and the method ends.

Since it is possible that the last remaining circuit can fail, or no options can compensate for a fail in the last remaining circuit, step 790 allows the method to terminate and a signal sent indicating an un-fixable fail has occurred and the circuit is no longer operational.

Thus, the present invention provides a method for mitigating the probability of early failures due to increased operating frequency.

The description of the embodiments of the present invention is given above for the understanding of the present invention. It is understood that the invention is not limited to the particular embodiments described herein, but is capable of various modifications, rearrangements and substitutions as will now become apparent to those skilled in the art without departing from the scope of the invention. For example, after a given number of clock cycles a voltage regulator could be replaced with another voltage regulator of a different output voltage than the replaced voltage regulator, or the original voltage regulator can be adjusted to output a different voltage level than before in order to compensation for wear-out of circuits supplied by the voltage regulator. Further, the signal being counted need not be a clock signal but any signal switching between two (or more) states. The system may have inherent features of being total autonomic, or smart-autonomic. As various units as described above are replaced, an overall autonomic counter may be employed to keep track of the Ahealth of the system,@ providing a weighted output that will elicit additional smart-autonomic controls. For example, if a voltage regulator is operating on its last replacement module, the smart-autonomic controller may reduce the input voltage to the regulator thus placing it on a longer, or indefinite lifetime curve. The smart-autonomic controller may also send console messages, or log this event for a field repair to occur. The smart-autonomic controller may also, for example, replace a last failing unit (e.g. a system clock) with one that is optimized to operate at a reduced frequency, and is known as in the case of the voltage regulator to have an infinite lifetime curve. Such interventions are easily integrated with technology alterations, in the case of the clock example by having an infinite lifetime clock designed at a gate length that is known reliable. In this case the unit would suffer frequency degradation, but as in the case of the voltage regulator, a console message or log can alert field service to replace the entire unit. Therefore, it is intended that the following claims cover all such modifications and changes as fall within the true spirit and scope of the invention.

What is claimed is:

1. An integrated circuit, comprising:
an original circuit;
two or more redundant circuits;
a clock cycle counter configured to count cycles of a clock signal; and
a repair processor, said repair processor responsive to said clock cycle counter to:
  (a) replace said original circuit with a first redundant circuit when said cycle counter reaches an initial pre-determined count of a set of counts;
  after (a), (b) replace a previously selected redundant circuit with another redundant circuit each time that said clock cycle counter reaches subsequent predetermined counts of said set of counts; and
  (c) repeat (b) until no unselected redundant circuits have been selected.

2. The integrated circuit of claim 1, further including:
a robust redundant circuit; and
said repair processor further configured to replace said last redundant circuit with said robust redundant circuit when said clock cycle counter reaches a last count of said set of predetermined counts.

3. The integrated circuit of claim 1, wherein said repair processor is responsive to said clock cycle counter to:
  (d), replace a last selected redundant circuit with a different circuit each time said cycle counter reaches subsequent predetermined counts of said set of counts, said different circuit selected from the group consisting of said original circuit and one of said two or more redundant circuits, in the sequence from said original circuit to said first redundant circuit through said last redundant circuit and back to said original circuit.

4. The integrated circuit of claim 3, further including:
an error detection circuit configured to determine if said original circuit and if any of said one or more redundant circuits has failed;
a tracking register coupled between said error detection and said repair processor, said tracking register for storing information marking failed original circuits and failed redundant circuits as failed circuits; and
said repair processor is further configured to not replace said original circuit and any redundant circuit with a failed circuit.

5. The integrated circuit of claim 1, further including:
a stress reduction circuit coupled to said original circuit and said one or more redundant circuits and responsive to said repair processor; and
said stress reduction circuit configured to modify one or more operating parameters of said original circuit, of said one or more redundant circuits or of said original circuit and said one or more redundant circuits when said clock cycle counter reaches a particular pre-determined count of said set of counts.

6. The integrated circuit of claim 1, wherein said stress reduction circuit is selected from the group consisting of voltage regulator circuits, switching circuits configured to select a frequency of said pulsed signal, pulse generating circuits configured to select said frequency of said pulsed signal, bias circuits configured to select a bias voltage to apply to bodies of transistors in said original circuit, said one or more redundant circuits or both said original circuit and said one or more redundant circuits, and combinations thereof.

7. The integrated circuit of claim 1, wherein said original circuit and said one or more redundant circuits are selected from the group consisting of a digital circuit, an analog circuit, a memory circuit, a latch, a logic gate, a group of logic gates, a transistor, a diode, a resistors, capacitor, an inductor and a wire.

8. The integrated circuit of claim 1, further including:
wherein said clock cycle counter comprises one or more sub-clock cycle counters each having a latch configured to store a running total count of cycles of said clock signal; and
a decode circuit coupled to said latches of said sub-clock cycle counters, said decode circuit configured to replace a particular sub-clock cycle counter with a different sub-clock cycle counter each time said running total count reaches predetermined counts of said set of counts.

9. An integrated circuit, comprising:
an original circuit;
a clock cycle counter configured to count cycles of a clock signal; and
a stress reduction circuit coupled to said original circuit and coupled to and responsive to a repair processor, said stress reduction circuit configured to modify one or more operating parameters of said original circuit when said clock cycle counter reaches a particular pre-determined count of cycles of said clock signal.

10. The integrated circuit of claim 9, wherein said stress reduction circuit is selected from the group consisting of voltage regulator circuits, switching circuits configured to select a frequency of said pulsed signal, pulse generating circuits configured to select said frequency of said pulsed signal, bias circuits configured to select a bias voltage to apply to bodies of transistors in said original circuit, said one or more redundant circuits or both said original circuit and said one or more redundant circuits, and combinations thereof.

* * * * *